W. Judson,
Nose Ring,
N⁰ 56,061.          Patented July 3, 1866.
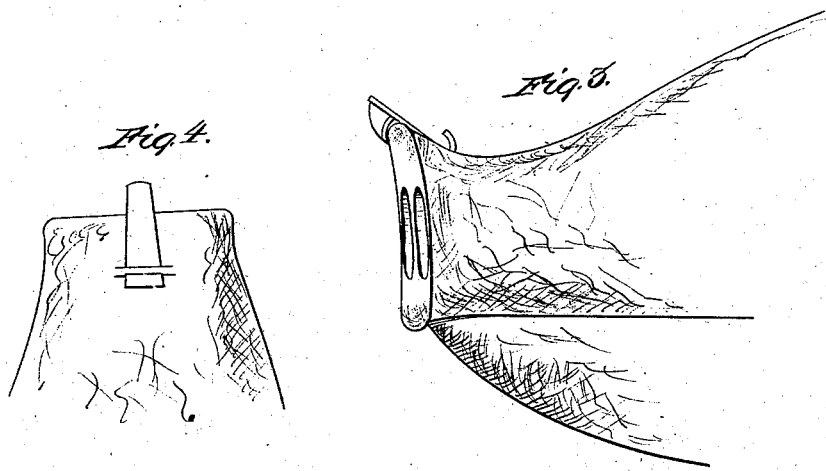

UNITED STATES PATENT OFFICE.

WHITCOMB JUDSON, OF GALESBURG, ILLINOIS.

IMPROVED DEVICE FOR PREVENTING HOGS FROM ROOTING.

Specification forming part of Letters Patent No. 56,061, dated July 3, 1866.

*To all whom it may concern:*

Be it known that I, WHITCOMB JUDSON, of the city of Galesburg, Knox county, State of Illinois, have invented a new and Improved Device for Preventing Hogs from Rooting; and I do hereby declare the following description and accompanying drawings are sufficient to enable any person skilled in the art or science to which it most nearly appertains to make and use my said invention or improvements without further invention or experiment.

The nature of my invention and improvement has reference to the construction of a peculiar device and the application of it to and on the top of the rooter of a hog to prevent their rooting.

The figures in the drawings represent views of the device detached from the rooter and applied to the same, as follows:

Figure 1 is a flat view of the device; Fig. 2, side view, in which the peculiar form of construction is clearly seen; Fig. 3, side view of the rooter of a hog, showing the application of the device to and on the top thereof; Fig. 4, top view of rooter and device.

Similar letters in all figures of the drawings indicate like parts.

The construction and application of the device are as follows: I take a piece of plate metal, and cut out of it the device, somewhat in the shape as seen in Fig. 1, and of a size suitable to accomplish the purpose. The size represented in the drawings may be deemed sufficiently full to answer. One end of the device, after thus being cut out, is bent or turned over in the form of a hook, (see *a* in Fig. 2,) the object of which will be understood hereafter. The other end has a small curved piece securely attached to the face of the device, the form and location of which may be seen in the same figure, *b*. The under part of this piece is sharpened, something after the fashion of a knife-blade, slightly curved, and pointed at its extreme end. The device thus formed is applied as seen in Figs. 3 and 4.

A represents the snout or rooter of the hog. A straight incision is made across on the top of the same, of such a nature as will admit the bent or turned-over portion of the device, which is introduced through the incision by compressing the sides of the snout with the forefinger and thumb.

The bent portion of the device, it will be seen, keeps it in place, and thus prevents its working out of the incision.

The point where the incision is made being on the cartilage part of the snout, no injury need be apprehended therefrom or from any movement of the device therein. The other end of the device, at which the pointed curved piece is attached, as described, projects over the top of the snout, so that any attempt on the part of the hog at rooting up the ground will thus be prevented by the pricking of the pointed piece on the snout.

The incision may be seen in the top view of the snout at *c* in Fig. 4.

Having thus fully described my invention, what I claim as new, and desire to secure by Letters Patent, is—

The construction and application of the device on the top of the snout of a hog to prevent rooting, substantially in the manner as described.

WHITCOMB JUDSON.

Witnesses:
JOHN MORROW,
H. W. CARPENTER.